US008208689B2

(12) United States Patent
Savolainen et al.

(10) Patent No.: US 8,208,689 B2
(45) Date of Patent: Jun. 26, 2012

(54) METHOD FOR DETERMINATION OF STAND ATTRIBUTES AND A COMPUTER PROGRAM FOR PERFORMING THE METHOD

(75) Inventors: Pekka Savolainen, Inkoo (FI); Heikki Luukkonen, Helsinki (FI); Juha Hyyppa, Espoo (FI); Eija Honkavaara, Espoo (FI); Xiaowei Yu, Espoo (FI); Antero Kukko, Espoo (FI)

(73) Assignees: Blom Kartta Oy, Helsinki (FI); Geodeettinen Laitos, Masala (FI)

( * ) Notice: Subject to any disclaimer, the term of this patent is extended or adjusted under 35 U.S.C. 154(b) by 1037 days.

(21) Appl. No.: 10/598,322

(22) PCT Filed: Mar. 14, 2005

(86) PCT No.: PCT/FI2005/000150
§ 371 (c)(1),
(2), (4) Date: Jun. 24, 2008

(87) PCT Pub. No.: WO2005/088252
PCT Pub. Date: Sep. 22, 2005

(65) Prior Publication Data
US 2008/0260237 A1   Oct. 23, 2008

(30) Foreign Application Priority Data
Mar. 15, 2004   (FI) ...................................... 20040396

(51) Int. Cl.
*G06K 9/00* (2006.01)
(52) U.S. Cl. ..................................................... 382/110
(58) Field of Classification Search ........... 382/100–110
See application file for complete search history.

(56) References Cited

U.S. PATENT DOCUMENTS

| | | | | |
|---|---|---|---|---|
| 6,792,684 | B1 * | 9/2004 | Hyyppa | 33/1 A |
| 7,187,452 | B2 * | 3/2007 | Jupp et al. | 356/501 |
| 7,212,670 | B1 * | 5/2007 | Rousselle | 382/173 |
| 7,728,833 | B2 * | 6/2010 | Verma et al. | 345/420 |
| 7,974,813 | B2 * | 7/2011 | Welty et al. | 702/143 |
| 2003/0030582 | A1 | 2/2003 | Vickers | |
| 2004/0236535 | A1 * | 11/2004 | Hyyppa et al. | 702/155 |
| 2007/0291994 | A1 * | 12/2007 | Kelle et al. | 382/110 |
| 2010/0250482 | A1 * | 9/2010 | Ma | 706/54 |
| 2011/0110562 | A1 * | 5/2011 | Kelle et al. | 382/110 |

OTHER PUBLICATIONS

Hosford, S. "Fusion of airborne laser altimeter and RADARSAT data for DEM generation." Bureau de Recherche Geologique et Miniere (BRGM), French Geological Survey (2003): 806-808.
Suzuki, Yasuhiro. "A GIS-based study toward forecast of suburban forest change." GeoJournal vol. 51. (2001): 203-212.
Ackermann, Friedrich. "Digital Terrain Models—New Techniques, Demands, Concepts." IAPRS vol. 32, Part 3-4W2 (1997): 1-8.

* cited by examiner

*Primary Examiner* — Jingge Wu
(74) *Attorney, Agent, or Firm* — Fasth Law Offices; Rolf Fasth

(57) ABSTRACT

The method is for forest inventory and for determination of stand attributes. Stand information of trees, sample plots, stands and larger forest areas can be determined by measuring or deriving the most important attributes for individual trees. The method uses a laser scanner and overlapping images. A densification of the laser point clouds is performed and the achieved denser point clouds are used to identify individual trees and groups of trees. A computer program is used for performing the method.

25 Claims, 11 Drawing Sheets

AERIAL PHOTOGRAPHY

LASER SCANNING

Point cloud describing the tree crown calculated from laser observations

Photogrammetrically densified point cloud

FIG 4 Principle of photogrammetric point measurement. The same target is observed from two overlapping images and the XYZ-target coordinate is calculated as a forward intersection in the space.

Fig. 5 Laser observation marked with x, the added points are white squares

METHOD FOR DETERMINATION OF STAND ATTRIBUTES AND A COMPUTER PROGRAM FOR PERFORMING THE METHOD

PRIOR APPLICATIONS

This is a US national phase patent application that claims priority from PCT/FI2005/000150, filed 14 Mar. 2005, that claims priority from Finnish Patent Application No. 20040396, filed 15 Mar. 2004.

TECHNICAL FIELD

The invention is concerned with a method for forest inventory and determination of stand attributes. With the method, stand attributes of individual trees, sample plots, stands or larger forest areas can be determined by measuring or deriving the most important attributes of individual trees. The invention is also concerned with a computer program for performing the method.

BACKGROUND ART

Conventional forest inventory is still mostly based on field measurements. E.g. forest inventory at stand level, in which the forest is first divided into almost homogeneous compartments (typically of the size of 1-3 hectares), is presently based on plot measurement and visual observations. Aerial photographs and orthophotos (aerial images rectified to map projection) are generally used for the determination of stand boundaries and the walking route in the forest, but stand attributes, such as the volume ($m^3$/ha), basal area ($m^2$/ha, depicts the cross-sectional area per hectare corresponding to the trees cut at the height of 1.3 m), mean height (m), other basal area-type density attributes, tree species, age, and development class, are determined by measurements and assessments carried out in forests. This work has been tried to be made more effectively by increasing the level of automation, with field computers and with more automatic measurement equipment (see e.g. the Finnish patent FI 101016B). In forest inventory at stand level, the stand and tree attributes are calculated by plot wise information and visual observations. In addition to stand wise assessment, plot wise assessment, measurements of individual trees and estimation of larger areas, such as estimation of whole counties or parts of them, are carried out.

FI-patent 112402 presents a method, which is based on laser scanning and produces a three-dimensional presentation of the stand height in the forest. By applying pattern recognition methods to these height models, individual trees can be identified. The height, crown diameter and species can be derived for individual trees by means of the three-dimensional model. Other stand attributes are derived by means of this information. The advantage of the method is the very good accuracy (ca 10%) for the most important stand attributes (volume, basal area, mean height). The method requires, however, a considerably dense laser pulse amount for the separation of individual trees merely by means of laser information.

Earlier solutions are based on aerial image-derived canopy crown models combined with laser-derived digital terrain model (St. Onge and Achaia, Measuring forest canopy height using a combination of lidar and aerial photography data, http://larsees.geg.queensu.ca/lidar/publications/st-onge.pdf), identification of individual trees by using information from both aerial photos and laser (Leckie, Gougeon, Hill, Quinn, Amstrong, Shreenan, 2003, *Combined high-density lidar and multispectral imagery for individual tree crown analysis, Can. J. Remote Sensing,* Vol. 29, No. 5, pp. 633-649), connecting texture information from aerial images on to the laser models (Fujii, Arikawa, 2002, *Urban Object reconstruction using airborne laser elevation image and aerial image, IEEE Transactions on Geosc. and Rem. Sens.,* Vol. 40, No. 10, pp. 2234-2240), segmentation of large forest areas and generalization of height information produced by laser to larger areas (Wulder ja Sheeman, 2003, Forest inventory height update through the integration of lidar data with segmented Landsat imagery, Can. J. Rem. Sens., Vol. 29, No. 5, pp. 536-543). Furthermore, the Finnish patent FI 112402 presents concepts for combining laser and aerial images for tree species production.

OBJECT OF THE INVENTION

The object of the invention is to achieve a remote sensing method for forest inventory and determination of stand attributes, which is considerably more advantageous with respect to its remote sensing material costs than the invention of the Finnish patent FI 112402, but which still produces very accurate information.

SUMMARY OF THE INVENTION

In the method of the invention for determination of stand attributes by means of a laser scanner and images, a point cloud with three-dimensional information about the target points and describing the stand is produced by means of a laser scanner. The method is mainly characterized in that overlapping images are produced by aerial or terrestrial photography. Thereafter a denser point cloud with more target points with three-dimensional information is produced by completing the point cloud produced by the laser scanner with information from overlapping images produced by the photography. The stand attributes are then determined by means of the denser point cloud.

The inventive steps of the method are carried out by the computer program of the invention.

Some advantageous embodiments of the invention are presented in the subclaims.

The method of the invention is aimed at forest inventory and for determination of stand attributes. Information of trees, sample plots, stands or larger forest areas can be measured by the method by measuring and deriving the most important attributes for individual trees. Three-dimensional information about the stand is collected from the stand area by using such a number of sample hits that individual trees and groups of trees can be discriminated. Such an amount of sample hits can be achieved by densifying a sparser laser point cloud with such a surface model following the tree crown tops, which is calculated by means of overlapping images. In the method, a laser scanner and overlapping images are used. The laser point clouds are densified by means of overlapping images and the achieved denser point cloud is used to identify individual trees and groups of trees.

The determination of the stand attributes advantageously takes place in the invention by the following steps
1) Performing laser scanner measurements and producing overlapping images from the stand area
2) Transformation of the image information and the laser measurements into the same coordination system
3) Densification of the point cloud achieved by means of laser scanning with overlapping images
4) Identification of individual trees and groups of trees from point clouds by means of pattern recognition methods 5) Calculation of stand attributes by means of information from individual trees and tree groups to different applications The above steps 2-5 of the method of the invention can be carried out by means of a computer program There are clear gaps between the tree crowns in the northern boreal forest zone, many commercially exploited forest areas and also other forest areas. In Finland, ca 30% of the laser pulses are reflected from the ground. The invention presented in the Finnish patent FI 112402 made use of this fact in such a way that individual trees could be measured by means of a large number of laser scanner pulses. This invention makes use of said fact in that way that samples from the ground can be achieved with a relatively low number of pulses, which enables the production of a rough but sufficiently accurate Digital Terrain Model (DTM). A digital terrain model with the accuracy of usually 0.5 m can be produced with a laser scanner even with a small number of pulses. The accuracy is sufficient with respect to forest inventory at stand level.

The method of the claimed invention presented in this text makes use of both overlapping high resolution images (such as aerial images, satellite images and video images) and laser scanner measurements. The needed amount of pulses produced by the laser scanner is still much smaller than in said Finnish patent 112402, which, when necessary, enables high flight altitudes and wide scan strips (i.e. cost-effectiveness). The method is especially meant for operative forest inventory on stand level.

The point cloud produced by laser scanning and the image information shall be brought into the same coordinate system, so that the information from different sources can be combined to belong to the same target. Known equations for conversion between different coordinate systems are used for the conversion of the coordinates. The compatibility is further improved by identifying, from the different materials, groups of corresponding targets that clearly can be discriminated from the surroundings and by calculating from these targets a parametric conversion model by means of regression analysis.

From the sparse point cloud produced by the laser scanning, the hits measured form the ground and those measured above the surface of the ground, are distinguished from each other by using known methods, such as using the Terrascan software. The crown of a tree forms the main part of the cross-sectional area of the tree seen from the laser scanner and therefore the main part of the hits measured above the surface of the ground are hits to the crowns of the trees. These hits are used as a base in the automatic processing, in which more points, which are close to the starting points (the points produced by the laser), are produced from the stereo pairs of the image material.

Individual trees and groups of trees can be identified by means of the point cloud by using crown models, intensity information of laser and brightness values of the aerial images.

The calculation of stand attributes takes place by means of individual trees and groups of trees. The number of trees is identified statistically from groups of trees. There are several principles that can be used in the calculation of the tree attributes. The height, tree species and crown diameter can be calculated for each tree by means of the denser point cloud. By means of these attributes, the basal area, volume, stem diameter, age and development class can be determined for an individual tree. Without the canopy height information produced with laser and aerial images, the volume estimations of an individual tree are quite inaccurate. Alternative ways of calculation is to select sample trees and make use of crown coverage percentages in the analysis. Sample trees can be selected when the point cloud is so sparse that it is not even possible to get a sample from each tree. In such a case only those trees are selected from which the laser gets a sample, but from the denser point cloud, the highest derived point corresponding to the tree is selected to describe the height of the tree in question. In this calculation method, the sample trees are assumed to represent randomly the dominating storey. The number of the trees can be calculated in the same way as it is done with the pattern recognition methods in the above-mentioned basic method. In dense tree groups and when sparser point clouds are used, it is worth to perform the calculation by means of sample heights and crown coverage percentages produced by means of denser point clouds and pattern recognition, since the estimated stem number is underestimated compared to the real one.

The present invention avoids the condition of a dense number of laser pulses. It is more cost effective to conduct laser scanning surveys from higher altitudes to provide a wider coverage. On the other hand, the density of the points from the target is reduced. This reduction can be compensated by taking aerial images and by densifying the laser point clouds by using an aerial image block. A solution like this has not been used anywhere before. The costs of aerial photography are just a fraction of those of laser scanning.

The method of this invention is the cheapest of all such remote recognition methods for forest inventory which produce stand attribute information with an accuracy of 15%. The advantage of the invention compared to typical remote sensing methods is also that, with the method of the invention clear physical characteristics are measured from the object, in the form of ranging data, for which tree attributes, such as the volume, can be derived. Thus, the method does not necessary require the use of sample plots as teaching material, which decreases the costs for the method.

In the invention it has been understood to make use of laser scanners producing a modest pulse density in evaluation of stands together with image information. Earlier investigations (such as Nässet 1997) failed in producing accurate results with a similar material. A modest number of pulses enables cheaper laser material, which often is important for a user.

With the method of the invention it is, generally, possible on the northern coniferous forest zone to produce volume estimations for the stand with an error of 10-20% on stand level, which is sufficient in view of practical measurements. The method can also be applied elsewhere, especially in tropical planted forests. The cost efficiency of the method is increased by a continuous development of the laser scanners along with the fact that laser scanners data are becoming more common all the time. The method can also be automated or semi automated (meaning processing of collected material by means of a computer).

In the following, the invention is presented by means of figures and examples, which are not meant to restrict the invention in any way.

FIGURES

FIGS. 1-11 are coarse figures for clarification of the measuring act and processes.

DESCRIPTION OF THE INVENTION

Figure 1:
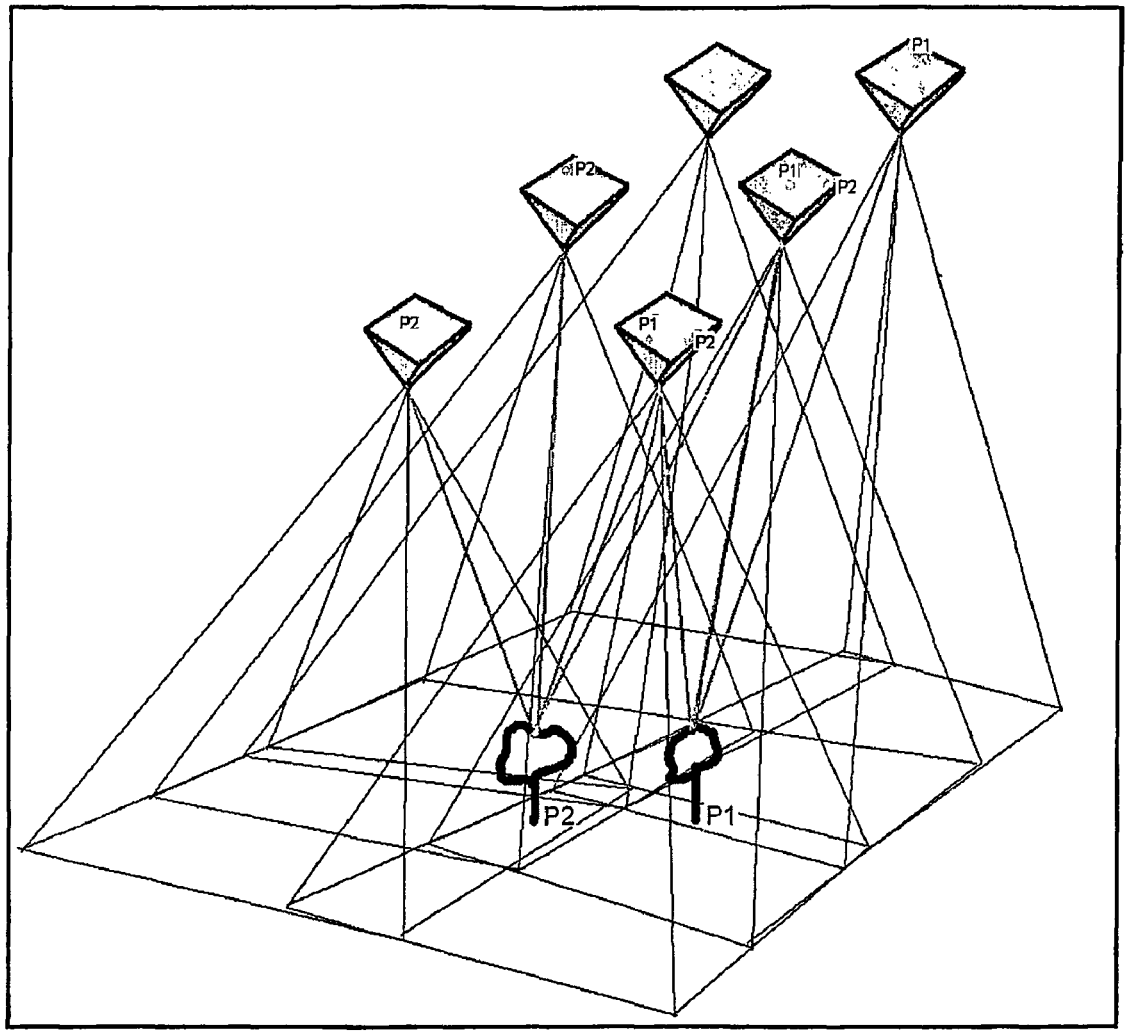
FIG. 1 is a principal view for producing overlapping images from the air.
Figure 2:
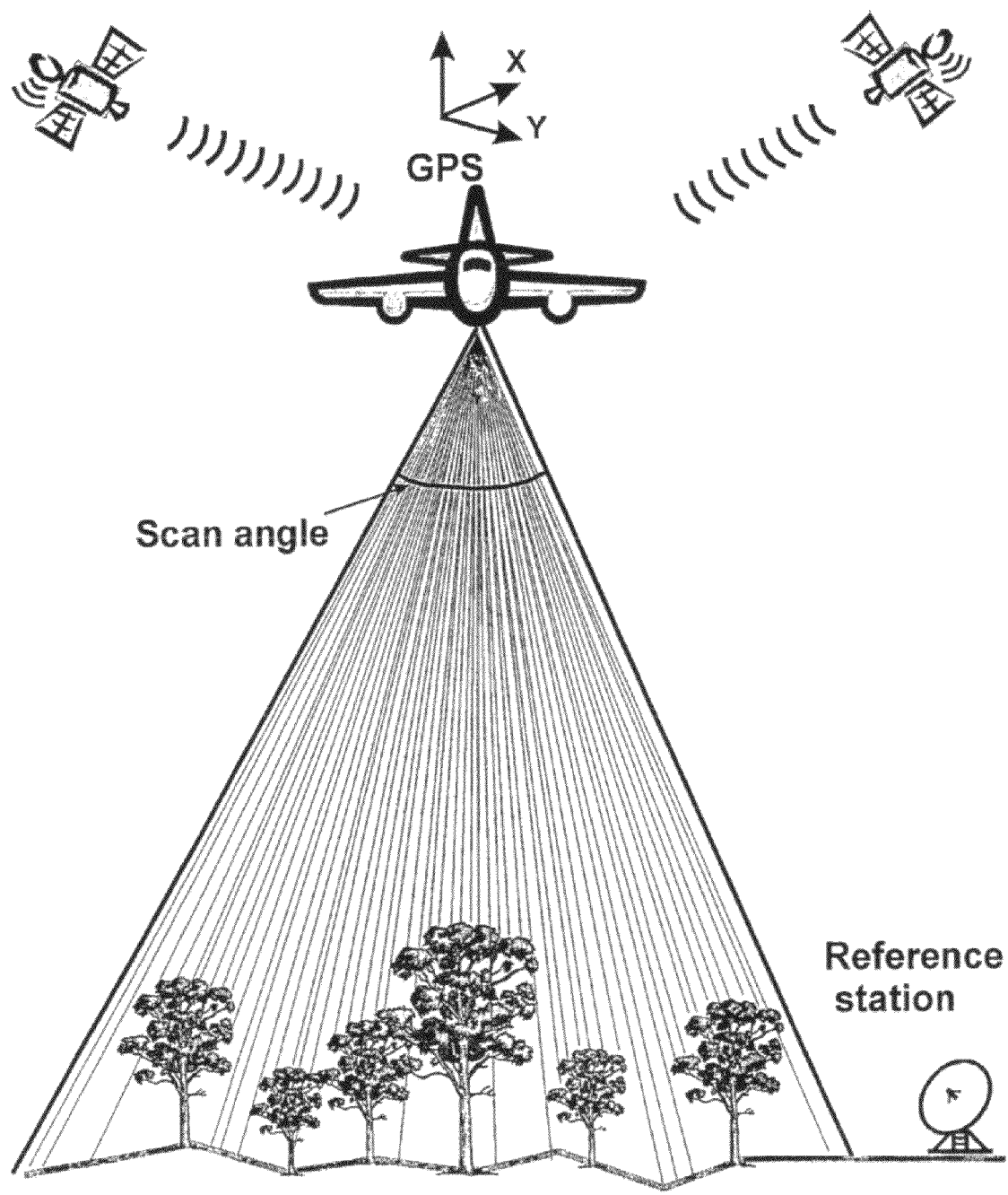
FIG. 2 is a principal view of a measurement situation by laser scanning.

Performing of Laser Scanning and Production of a High Resolution Aerial Image Block from the Forest Area FIGS. 1 and 2 present a general view of the measuring situation in the method. Both the laser measurement and the aerial photography are performed from a flying platform (an air plane, a helicopter, an unmanned aircraft, a remotely piloted aerial vehicle) above the stand. Of these, an airplane is for the time being the best vehicle for flat areas, a helicopter on mountain areas and the cheapest one is an automatically controlled unmanned aircraft or remotely piloted aerial vehicle. The devices (the laser scanner and the camera for taking aerial images) can either be in the flying vehicle taking simultaneous images or the fights can be done at different times. The advantage with doing the measurements at the same time is that the materials can be georeferenced with the same GPS/IMU observations and they are also otherwise geometrically closer to each other. Also the flight costs are then lower. The advantage of making the measurements separately at different times is that the imaging can then be performed, always when it is possible, with either one of the instruments. The laser scanning is a more flight intensive activity as the area covered is typically strip like, but the aerial photography is more sensitive for different weather conditions. On forest areas the laser scanning angles are at maximum ±15 degrees from the vertical direction. As the laser scanner is an active instrument, the laser scanning can also be performed at nighttime. The camera for taking aerial images can either be a film camera or a digital camera.

The laser scanner, FIG. 2, consists of a scanner part, which causes a deviation across the flight direction, of a laser gun, which produces the laser pulses, and of a detector part, which interprets the received signal and determines the distance to the target on the basis of that. The distance between the target and the laser device can be determined on the basis of the transmission time of the laser pulse sent by the laser gun of the laser scanner to the target and back again. When the orientation and position of the laser gun are known, the distance measured between the laser gun and the target can be converted to object position; this is what the whole measuring of surface models by means of laser is based on. The orientation and position of the laser device is typically determined by means of an inertial system and GPS positioning (Global Positioning System, a global satellite network for positioning). The inertial system measures either the orientation only or both the orientation and position by using inertia detectors. In the GPS measurement with laser scanner technique, there is one GPS receiver, which is in the same flying platform as the laser scanner and there is another GPS receiver on the ground as a reference station, FIG. 2, near by the area to be investigated, for example within a distance of 30 km. It is probable that reference stations on the ground can be avoided in the future by means of virtual GPS technique.

The production of an image with laser takes place by means of a scanner, which sweeps a laser pulse across the flight direction. In the other direction, the image is formed as the flying platform moves along the light line. In this way, the whole area of the target is covered. E.g. the distances between adjacent beams on the ground (the beam diameter typically being a couple of ten centimeters) are determined by the characteristics of the laser gun and the scanner (the pulse repetition frequency, number of parallel pulses, the maximum scanning angle and the way of scanning). There are several scanning mechanisms. In the conical scanning, the measurement angle to the target or object stays constant all the time. In so-called pushbroom scanning the orientation of parallel beams to each other is always constant.

Figure 4:
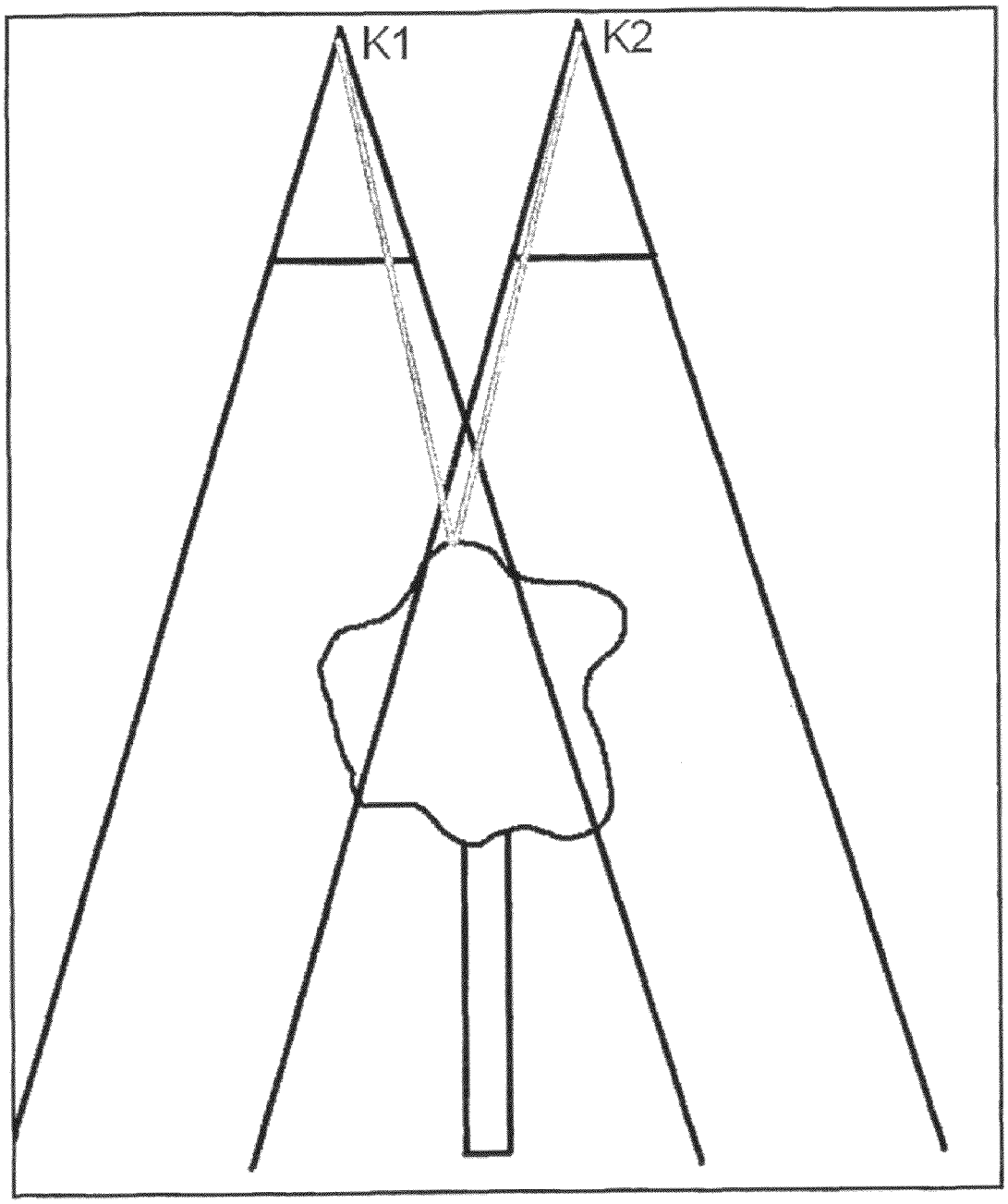
FIG. 4 is a principal view of photogrammetric derivation of points.

In aerial photography, the scattering of sunlight from the target is recorded by means of the metric camera either on a film or electronically. E.g. in Finland, aerial images are taken when the azimuth angle of the sun is over 33 degrees. The main purpose of photogrammetric mapping is to produce three-dimensional information of the target. The three-dimensional coordinates of the target can be determined if the target is observed from at least two different images, FIGS. 1 and 4. The calculation of target coordinates most usually take place as a three-dimensional forward intersection, FIG. 4. Typically, a photogrammetric mapping is done as a stereo interpretation from stereo images. A stereo image consists of two parts, both of which see the target to be observed from somewhat different perspectives. When the stereo image is observed—the left one with the left eye and the right one with the right eye—the images merge into one in the observer's mind and he sees the target/object three-dimensionally (as a stereo image). The measurement can also be done as a two-image measurement, whereby the target is measured separately from two overlapping images. The process of image measurements can be automated along with the use of digital images by the use of computational image matching techniques. The accuracy of the mapping is better the more images are used for the observation of the target. In photogrammetric mapping, a wide aerial image block is usually acquired (FIG. 1) as it is usually more cost effective to photograph a wider area at the same time and because, on the other hand, the determination of the external orientation of the images with the accuracy needed is most advantageous by means of a image block. The image block usually consists of several overlapping flight lines and each flight line consists of several overlapping aerial images. The coverage percentage of successive images in the sequence is typically 60% and the coverage percentage of adjacent flight lines is typically 30%. The brightness differences in the images caused by the geometry of the target, the image acquisition and the sun light cause problems especially for an automatic interpretation. Basics of photogrammetry have been presented e.g. in the work (Schwidefsky, K., Ackermann, F., 1976. Fotogrammetria. Otapaino, Espoo 1978).

For the measurement of trees it is important to conduct both measurements as perpendicularly as possible so that no shadowed areas would be formed behind the trees. In laser scanning, the scanning angle should preferably be smaller than 10 degrees from the nadir, at the maximum 15 degrees from the nadir. In test measurements, it has been observed that shadowed areas are formed even with scanning angles of 5 degrees. In accordance with the idea of the invention, such a laser device should be used which can be used as high as possible and still produce a reasonable density of laser spot hits, e.g. 0.5-5 hits per square meter. The laser pulse repetition frequencies are, however, growing. On 1999, the pulse repetition frequency of the leading laser scanner manufacturing company Optech was 10 kHz, now on 2004 it is 100 kHz. In addition, it is possible to measure the full waveform of the returned signal. The pulse repetition frequency of such a system is, however, only 33 kHz at an altitude of three kilometers. The reason for this is that in present systems, there is only one pulse on the way at the same time. The speed of light is thus a restriction. In future systems, this problem will, however, be solved. By using a laser scanner of 33 kHz at a flight altitude of 3 km with the flight speed of 66 m/s and with a maximum scanning angle of 10 degrees, the point density achieved is 0.5 pulses per square meter. No values for individual trees can be calculated from such a material. The invention provides a practical solution by using laser scanning point densities of today and still it makes an inventory by means of individual trees possible.

As the measurements have to be done with small measurement angles (to nadir), the area to be measured is narrow (1000 m wide with a flight altitude of 3000 m by assuming a maximum scanning deviation of 10 degrees), and it might be necessary, depending on application, to perform several parallel flights lines in order to cover the whole area.

In the preferable embodiments of the invention, different pulse modes used in different laser systems are also applied in the creation of different surface models. By storing the whole shape of the pulse, information can be produced, which helps the classification of the points into terrain and vegetation hits and helps also the determination of type of crown type (dense crown, separate knag, tree species).

Transformation of Image Information and Laser Measurements into the Same Coordinate System The point cloud and the aerial images are produced in the WGS-84 system because of the GPS technique used (additional information can be found in the book *GPS-paikanmääritys* (Markku Poutanen 1998)). If also inertia systems are used in the aerial photography, also the aerial images can be geo-referenced directly without indirect orientation process (without ground control).

In this way, the whole area is covered with laser scanning with small beams, for which coordinates can be determined. In order to be able to calculate the target coordinates of the targets measured from the images, the internal orientations (principal point, focal length) as well as the external orientations (position and attitude of camera at the time of recording) have to be known. The determination of the orientations is generally known technique. The internal orientations are usually determined by laboratory calibration. The external orientations of the aerial images are nowadays usually determined by bundle block adjustment, but in the future, the use of direct geo-referencing will also be possible (the external orientations are directly determined during imaging from recorded GPS and other observations). An image block (see the above description) is needed for the block adjustment. The observations for the block adjustment typically consist of tie points observed automatically or interactively from the overlapping images, the observations of external orientations during image acquisition (positions of projection centers and possible attitudes) and ground control points. At least the coordinates of the target hits and the external orientations of the images are unknown. The principle of the method is that observation equations (the condition of collinearity) are, formed between the target and image coordinates, wherein the unknown quantities are presented as parameters. The unknown quantities are solved by using the non-linear least squares method. The method is described e.g. in the work (Kraus, K. 1993. Photogrammetry. Volume 1—Fundamentals and Standard Processes. Ferd. Dümmlers Verlag).

The materials are converted to the desired coordinate system and projection (such as YKJ, KKJ and ETRS-TM35FIN) by using existing conversion formula. The mapping and land surveying organizations in each country are able to deliver the required conversion formula. The result is a data set of terrain points consisting of point clouds with x-, y- and z-coordinates and the external orientations of the aerial images in a desired coordinate and projection system. More information about the determination of coordinate systems and projections can be read from the book *Käytännön geodesia* (Martti Tikka 1985).

The matching of the data is further improved by identifying, from the different materials, a group of corresponding features clearly distinguishable and by calculating from these features, by e.g. regression analysis, a parametric polynomial conversion model by using known methods.

Figure 3:
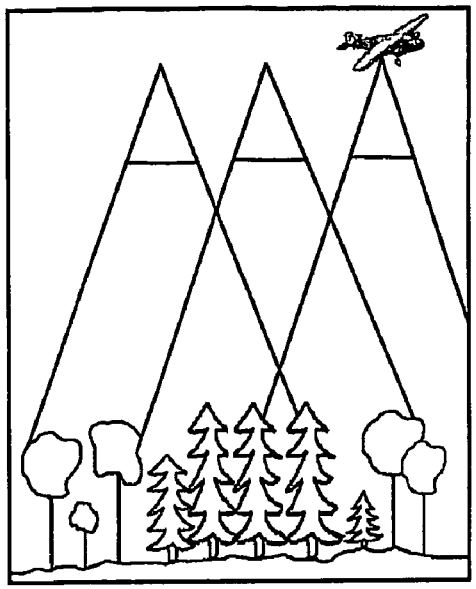
FIG. 3 is a principal view of photogrammetric densification by using overlapping images and point clouds achieved by laser scanning.
Figure 3:
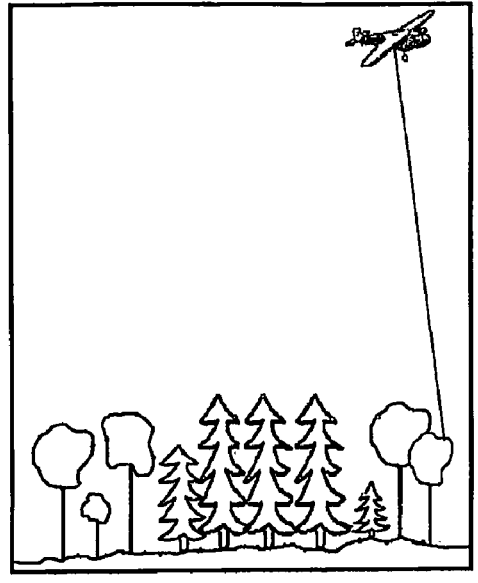
Figure 3:
Figure 3:
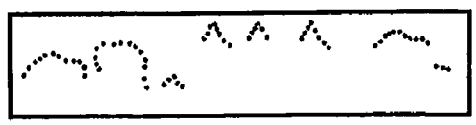
Figure 5:
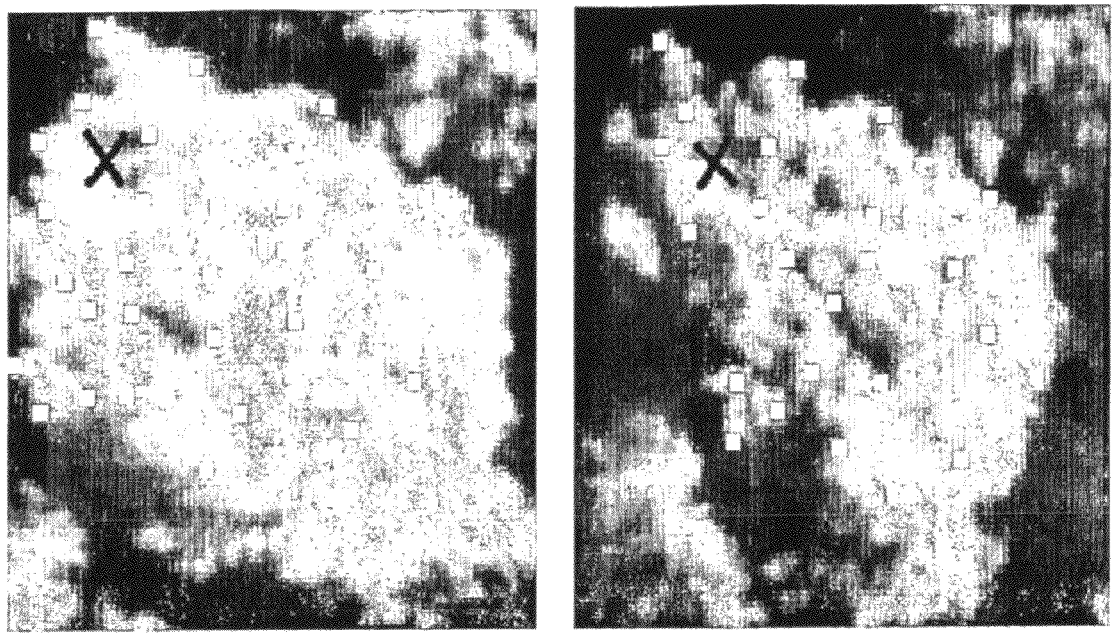
FIG. 5 is an example view of a tree crown for which a denser set of spot hits has been defined by means of images. The laser hits are marked with X and the added (densified) points have been marked with white squares.

Densification the Point Cloud Achieved by Laser Scanning by Means of an Aerial Image Block The densification of the point cloud achieved by laser scanning by means of an aerial image block is presented in FIGS. 3 and 5.

From the sparse point cloud produced by the laser scanning, the hits measured form the ground and those measured above the surface of the ground, are distinguished from each other by using known methods, such as using the Terrascan software (see www.terrasolid.fi). The crown of the tree forms the main part of the cross-sectional area of the tree seen from the laser scanner and therefore the main part of the hits measured above the surface of the ground are hits to the crowns of the trees. These hits are used as a base either in the manual, semiautomatic or automatic processes, in which more points of known xyz-coordinates are produced close to the laser hits classified as crown hits. When the same object is observed from two or more overlapping pictures, the object coordinates can be solved with a suitable photogrammetric method as described above.

In the manual interpretation, the operator measures interactively more crown hits in the surrounding close to the laser hits from the stereo pairs. The program operating in the background calculates crown parameters for the tree and guides the operator in the selection of points. The crowns interpreted by the program can be presented in real time on the images and the operator measures more points if needed. The program also analyzes other properties of the tree (e.g. the tree species), which are confirmed by the operator.

The semiautomatic process is an extension from the above-described manual method. The operator still leads and controls the measurement but the creation of points and the measurement takes place automatically with an image matching technique (a description of the image matching techniques follows). The program generates new points close to laser point by means of image matching and presents the interpreted crowns for the operator in real time in the same way as in the manual method. The operator either accepts or refuses the results and performs the needed corrections.

In the automatic process, the operator does not participate in the measurement process at all, instead the points are measured by automatic image matching technique. In the method, it is assumed that the interpretation and the measurement process can be automated with a sufficient accuracy. In the program a quality control routine is included. The routine calls, when necessary, manual or semi-automatic process.

The semiautomatic and the automatic measurement require use of image matching technique. There are several possible matching techniques and they are quite well known but they have in spite of that not been used earlier for densification of a point cloud produced by laser scanning and in the estimation of stand attributes. When the spatial resolution of the image is sufficient, the details of the tree are shown as a texture on the images, which can be applied in automatic image matching. In the measurement of the tree form, image matching techniques based on both features and brightness values of the image come into question. As the terrain resolution of the image is ca 5-20 cm, interesting points can be separated from the tree texture with feature extraction operators, e.g. Moravec or Förstner (Moravec, 1976, Towards automatic visual obstacle avoidance. Proc. 5th Int. Joint Conference on Artificial Intelligence, Förstner W, Gülch E., 1987, A Fast Operator for Detection and Precise Location of Distinct Points, Corners and Centres of Circular Targets. Proceedings of Intercommission Conference of Fast Processing of Photogrammetric Data, Interlaken, Switzerland, 1987, pp. 281-305.). Features are extracted at each laser hit to be densified from one or several images, wherein the hit exists. Corresponding features or objects are identified by means of geometric constraints (e.g. the 3D model of the tree) and/or by using image matching that is based on grey tones (e.g. image correlation or matching using the least squares). (Ackermann, F., 1984. Digital Image Correlation: Performance and Potential Applications in Photogrammetry. Photogrammetric Record, Vol. 11, No. 64, pp. 429-439. ISSN 0031-868X; Förstner, W., 1986, A Feature Based Correspondence Algorithm for Image Matching. International Archives of Photogrammetry and Remote Sensing, Vol. 26, Part 3/3, pp. 150-160; Förstner, W., 1995, Matching Strategies for Point Transfer. Photogrammetric Week '95, D. Fritch, D. Hobbie (Toim.), pp. 173-183. ISBN 3-87907-277-9; Lemmens, M. J. P. M., 1988, A Survey on Stereo Matching Techniques. International Archives of Photogrammetry and Remote Sensing, Vol. 27, No. B8, ss 11-23). An alternative image matching technique using global reconstruction of individual trees, which is based on global object reconstruction. (Ebner H., Heipke C. & Holm M. 1993, Global image matching and surface reconstruction in object space using aerial images. Proc. of SPIE, OE/Aerospace and Remote Sensing: Integrating Photogrammetric Techniques with Scene Analysis and Machine Vision. 14-15 Apr. 1993, SPIE Vol. 1944-04, pp. 44-57). In the global reconstruction of individual trees, the external orientations of the images are assumed to be known and the object reconstruction is done on a small area.

Figure 6:
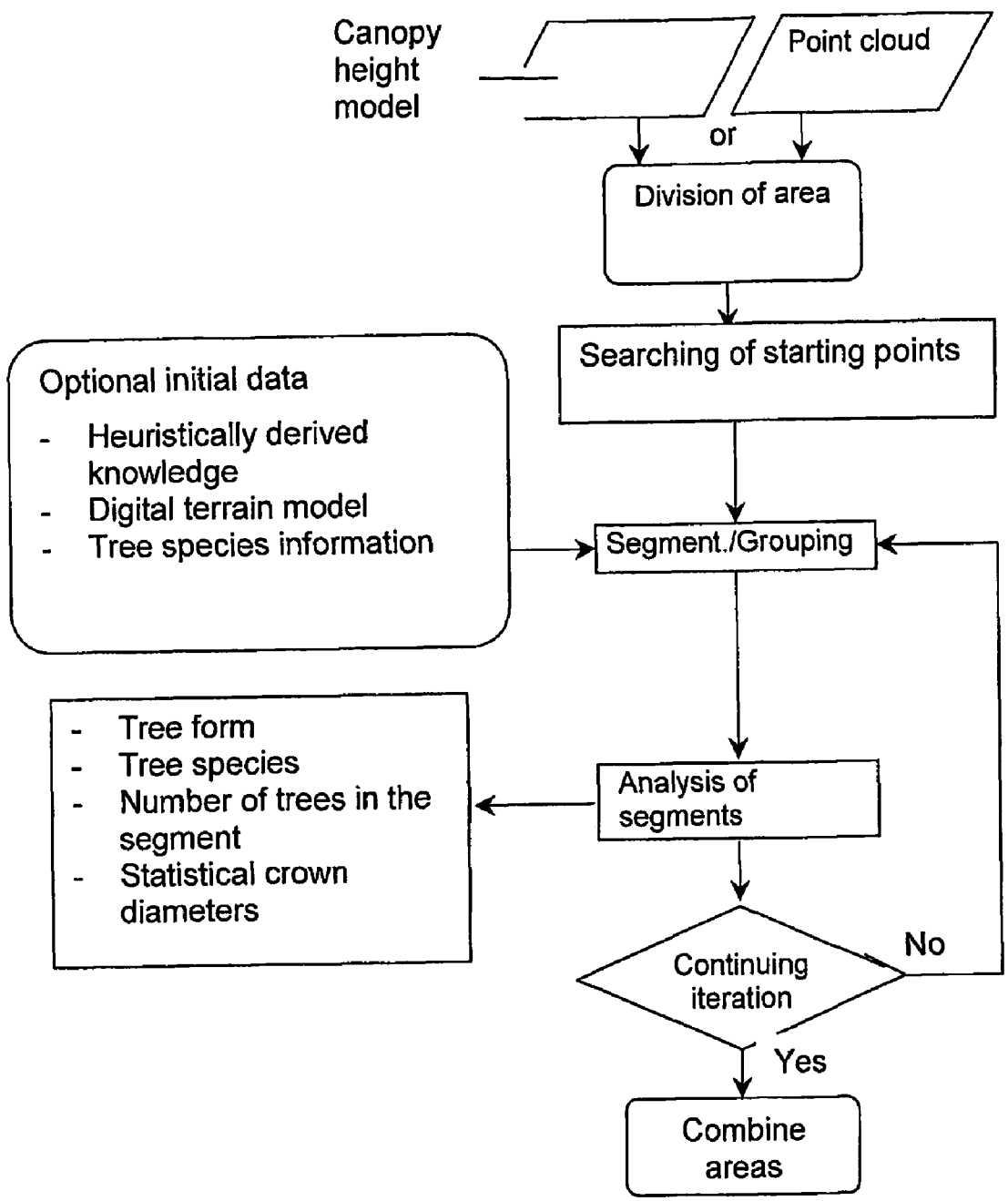
FIG. 6 is a flow diagram of a method developed for identification of individual trees or groups of trees.

Identification of Individual Trees and Tree Groups from a Point Cloud with Pattern Recognition Methods Identification of individual trees and tree groups from point clouds partly takes place by interactive computer work and partly by pattern recognition methods. A very efficient and new way of performing this process has been presented in detail in the following, FIG. 6.

The input information given to the process consists of the densified point cloud, the digital terrain model (calculated with known methods from point clouds, e.g. by means of the Terrascan software or the method presented in the Finnish patent FI 112402), and a crown model describing the crowns (calculated with known methods, see the Finnish patent FI 112402). Alternatively, also the coordinates describing the teaching areas can be given as the input information. The materials have to be in the same coordinate system. The densified point cloud might also include a brightness value derived for them from the aerial images and the scattering intensity value produced by the laser scanning. The intensity can also be presented continuously (full waveform).

The initial data achieved from the segmentation process consist of segments (midpoint and vectors delineating the crowns, the surface area of the segment, an evaluation of the number of trees inside a segment and of tree species).

In the following, a process, wherein the identification of individual trees and groups of trees takes place by pattern recognition methods is called a segmentation process.

The following steps are included in the presented segmentation solution

1. Dividing of a target area into smaller areas
2. Searching of starting points corresponding to individual trees and groups of trees
3. Use of heuristic methods in cluster analysis (an alternative solution)
4. Segmentation and clustering of individual trees and groups of trees
5. Analysis of produced segments The dividing of the target area in smaller areas is done of practical needs since the area to be investigated might be very extensive.

The searching for the starting points can be assisted using a canopy height model, which is the difference between the crown model and the digital terrain model. The canopy height model can be filtered by a low-pass filter so that small details in the crowns would not cause a division of the crown into too many segments. The low-pass filter can be e.g. the following 3×3 convolution filter

[1 2 1
2 4 2
1 2 1]/16.

It is also possible to perform several filterings with the same filter.

The local maximum can be found after the filtering. Thereafter it is recommendable to print out the points (initial points) corresponding to these maxima on top of the canopy height model, the filtered canopy height model and the aerial image. It would be preferable to use several different filters and filterings. The user can then choose the final starting points to be used after a visual observation.

Approximations are determined for each crown by means of heuristic methods (for the cross-section, the tree species and the tree height).

An approximation for the stand height is achieved by means of the unfiltered canopy height model and the starting points.

An estimation of the tree species is achieved by means of the intensity value, the brightness values achieved from the aerial images and form factors from the point cloud. The tree species of the tree corresponding to each starting point is estimated by conventional remote inventory classification methods.

When the tree height and tree species has been estimated for each starting point, also the probable crown diameter of the tree corresponding to the starting point can be evaluated. A statistical lower and upper limit is calculated for the crown diameter, which are used to prevent several trees from coming to the same segment and also the division of the segment from becoming too small.

The real segmentation is performed by means of k-means clustering analysis. In clustering analysis, the starting points calculated by means of the crown model are used as the possible midpoints of the crown, but transferred a little downwards on the z-axis (e.g. the tree height/6). The crowns of the trees are assumed to be three-dimensional volumes, for example spheres or ellipsoids. The points higher than 1-2 m from the ground are taken into consideration in the analysis. The k-means clustering algorithm expressly strives to minimize the distances of other points to the midpoint. The process is iterative. The k-means algorithm can e.g. be found from the Matlab software. In the process, it is determined for each point in the point cloud the crown to which the point belongs by means of the distance. Thereafter, a new midpoint is calculated for the crown. The process is continued until the information of points in the point cloud to which it belongs is no longer significantly changing.

Each segment/group is analyzed. The intelligence of the process lies in how efficiently new starting points can be created when observing that a segment/group in fact consists of several trees. During the clustering the heuristic starting information for the part of the crown size derived for each potential tree should be made use of. If, on the basis of the investigation of the point cloud or heuristic data, it is observed that the point cloud consists of several trees, the point cloud is divided into parts by giving several starting points and for that part, the analysis starts again. If the point cloud cannot be divided into parts, but there is of statistical reasons considered to be several trees, the number of trees is included into the segment data. The vectors delineating the crown are determined by means of the point cloud corresponding to each tree or tree group.

Figure 8:
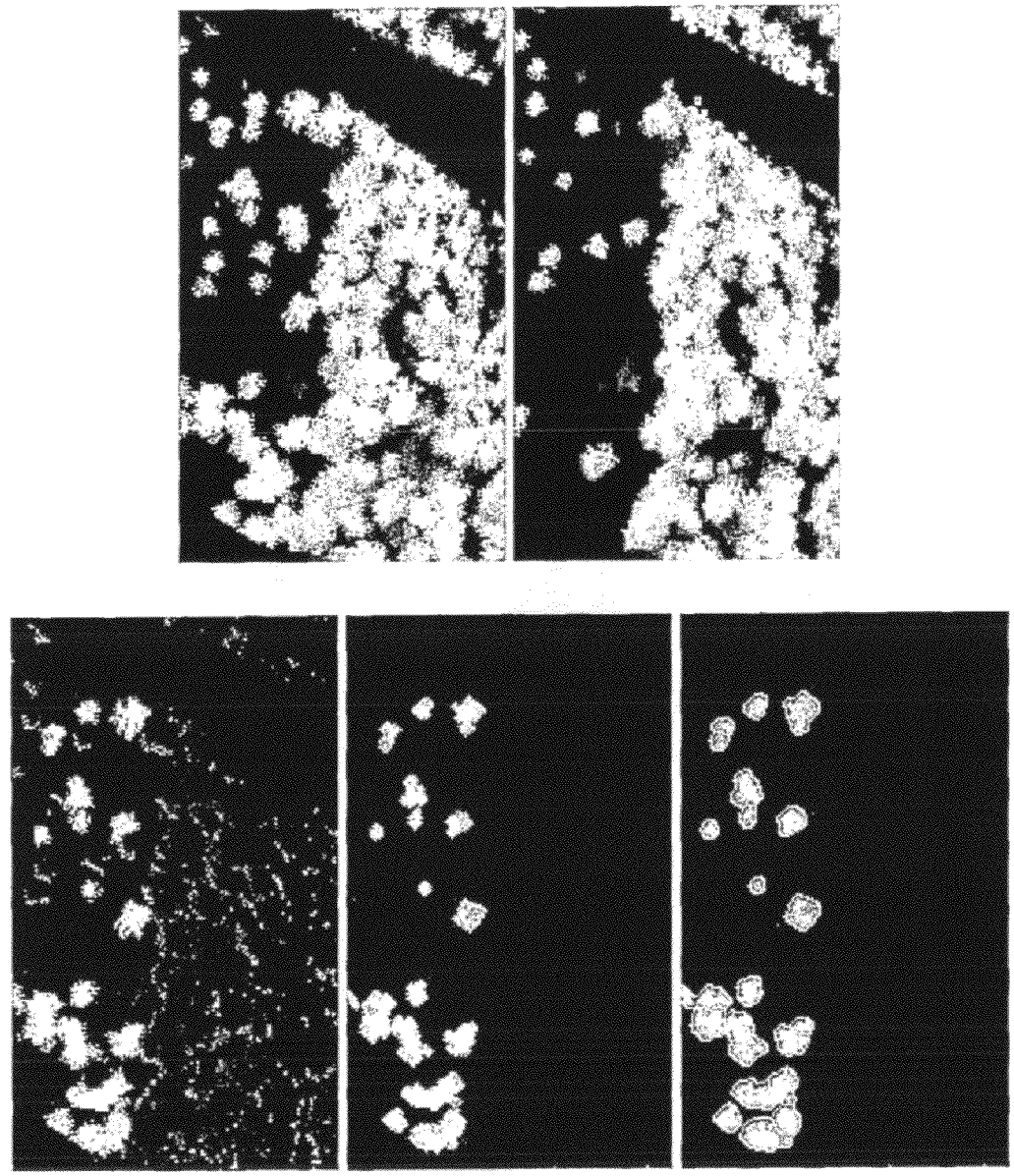
FIG. 8 is an example view showing how harvested and fallen trees can be determined from a good quality densified point cloud.
Figure 9:
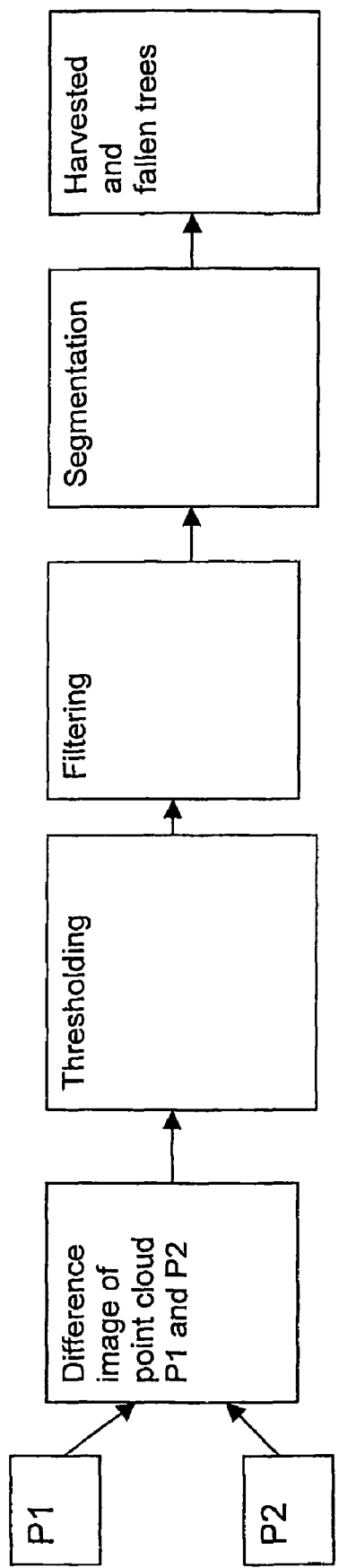
FIG. 9 is a flow diagram for automatic observation of harvested and fallen trees by pattern recognition methods.

Calculation of Stand Attributes by Means of Individual Trees and Groups of Trees for Different Applications In the determination of stand attributes, the invention presented can be applied in the following way:
1. Use of attributes of individual trees calculated from the densified point clouds in inventories, growth models, estimation of environmental impacts, mapping of flight obstacles
2. Calculation of other stand attributes by means of data measured for individual trees or groups of trees from the densified point clouds and deriving of sample plot wise and stand wise attributes in forest inventory, FIG. 10
3. Determination of a change of the stand, such as a growth of the stand or a thinning, by means of point clouds achieved at different times and by means of densified point clouds. The growth information can, in addition to forest inventory, be used in the mapping of flight obstacles, monitoring of trees surrounding power lines, and in estimation of the need for cutting, FIGS. 7, 8 and 9.
4. Use of a crown model calculated from a densified point cloud in the correction of the brightness value of an aerial image
5. Updating old forest inventory information by means of point clouds measured at different times and by means of a densified point cloud, FIG. 11.
6. The method can also be used in mobile mapping, wherein laser measurements done form a car or from a stand are densified photogrammetrically by means of images.
7. For making software Determination of Individual Tree Attributes Attributes of individual trees or groups of trees can be determined by existing; equations, which are presented e.g. in the Finnish patent FI 112402; the following is a principle in a shortened form.

The mean diameter L of the crown is calculated by means of the area A covered by the crown (segment). The maximum point of the canopy height model (the highest point of the tree) found inside the crown is assumed to be the height h of the tree. The position of the tree is determined by means of the x and y coordinates corresponding to the maximum point. On the northern boreal forest zone, there is a clear connection between the mean diameter L of the tree crowns and the stem diameter d of the tree. The development class of the tree can be determined by means of the diameter and the height and the age of the tree can be estimated. The basal area g ($m^2$/ha) of an individual tree is achieved by means of the stem diameter d. The stem number can simply be determined by means of the number of segments determined from the image (by taking into consideration that there might be several trees in one segment).

The tree species can be determined by means of a near infrared channel of a false-color aerial image in such a way that the channel in question discriminates broad-leaved trees and pines as well as spruces from each other by using conventional remote mapping classifiers, the input information being the mean values of the channels of the aerial image within the segment area, the mean value of the intensity information within the segment area as well as the statistical moments calculated from these values and also the statistical moments of the possible intensity profile data.

The estimation of the volume of an individual tree is calculated by three different ways: 1) the estimation of the volume only by means of the stand height, 2) the estimation of the volume by means of the stand height and the determined stem diameter and 3) the estimation of the volume by means of height, stem diameter and tree species. Laasasenaho (1982) (J. Laasasenaho, 1982, *"Taper curve and volume functions for pine, spruce and birch"*, *Communicationes Instituti Forestalis Fenniae* 108, 74 s.) has presented functions for how the volume of an individual tree can be calculated for each tree species by means of height and stem diameter.

The height data of individual trees calculated from the photogrammetrically densified point clouds can, in addition to forest inventory, be used in many applications, such as for stand follow-up, mapping of flight obstacles, wherein trees that are too high and restrict the flight are observed and in the monitoring of power lines the trees that are too close to the power lines can be observed as well.

Test Area or Pattern Wise Attributes

Stand attributes corresponding to the sample plot or a forest stand can be determined by calculating the corresponding attributes by using the attributes of an individual tree from a desired area. For instance the volume corresponding to the stand per hectare can be calculated by summing up the volumes of all individual trees inside the stand in question and by dividing the volume with the size of the stand. The accuracy of the estimations can be improved for the part of the invisible canopy part by means of the distribution principles describe in the Finnish patent FI 112402.

Figure 10:
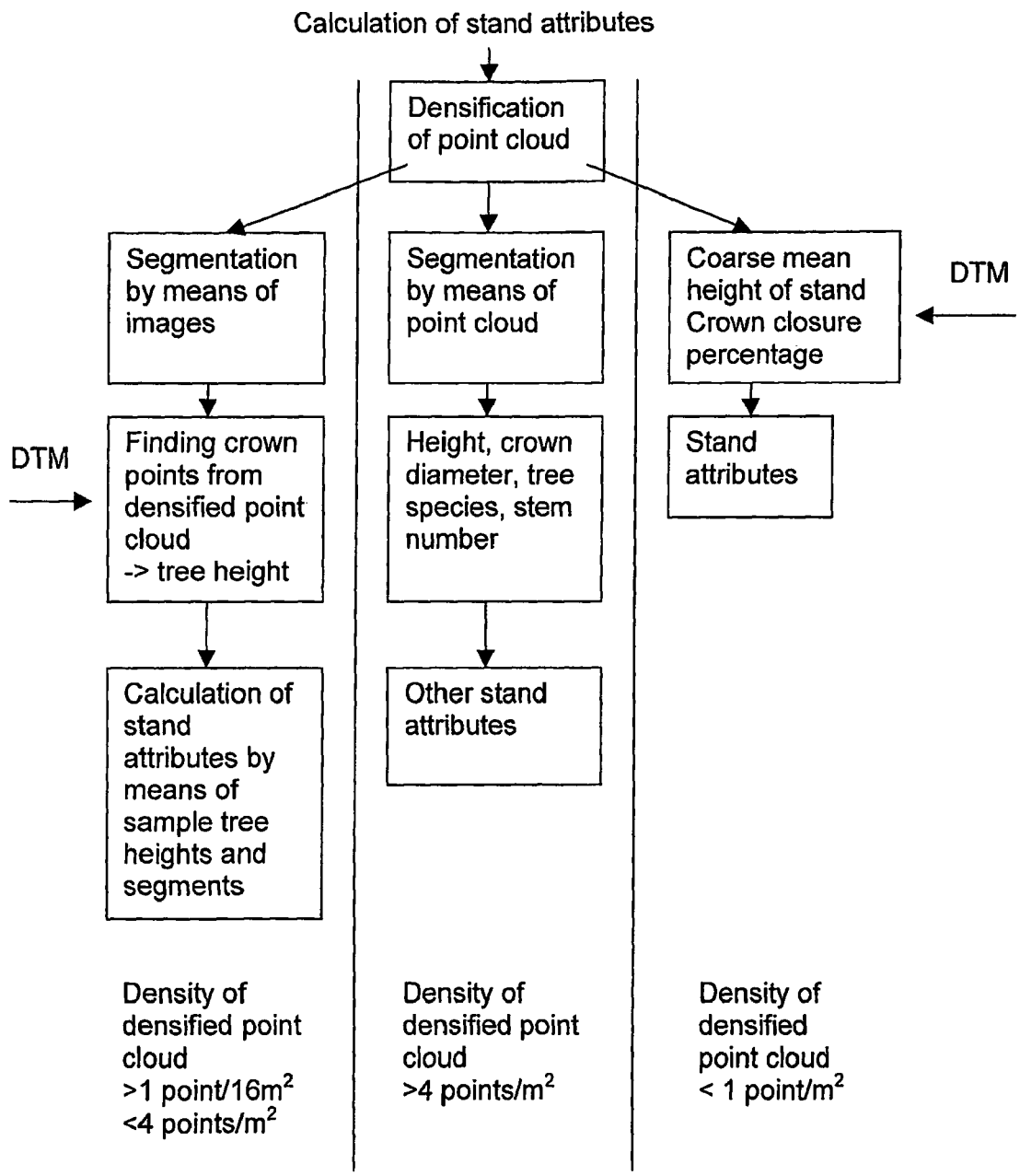
FIG. 10 is a flow diagram for calculation of stand attributes from a photogrammetically densified point cloud.
Figure 11:
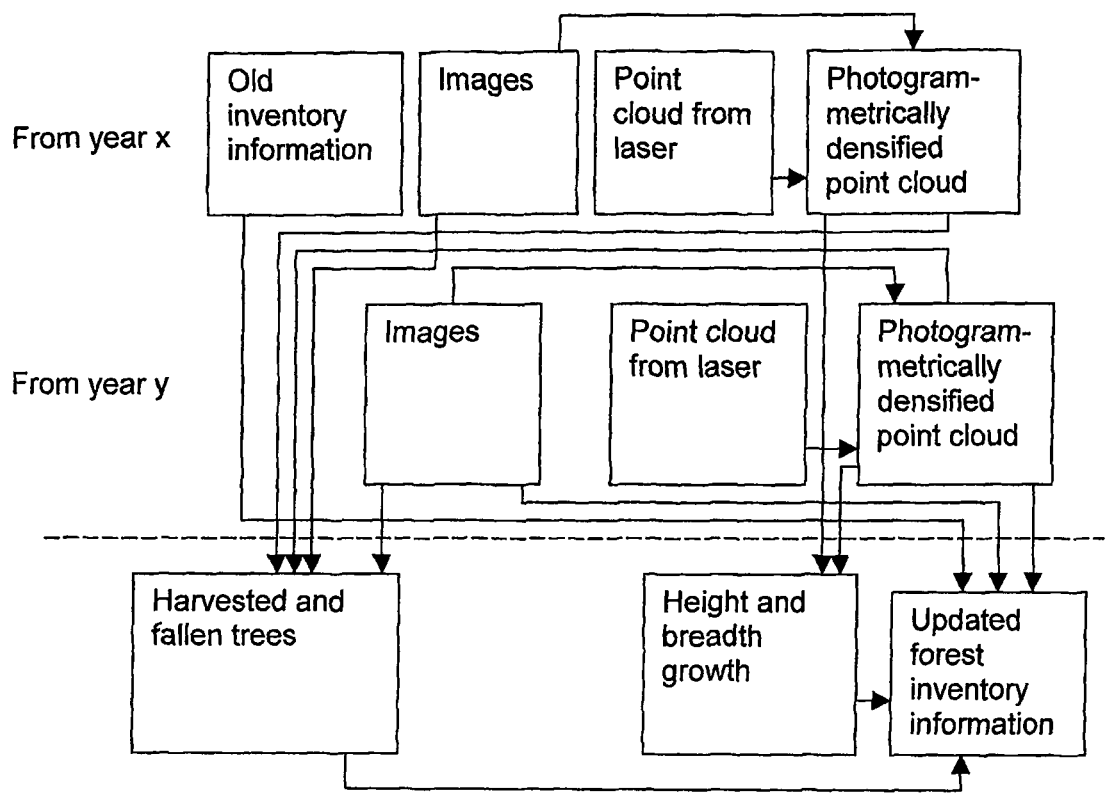
FIG. 11 is a flow diagram for determination of stand attributes by means of updating using material of two different times.

FIG. 10 describes an advantageous way of dividing point clouds of different densifications and the methods used for the calculation of the stand properties.

The mean height is achieved either as an arithmetic average value for individual tree heights or as a weighed average value. The practice in forest inventory is usually to calculate the weighed average value, wherein the weighing factor is the basal area of each individual tree. The basal area per hectare is achieved by summing the basal areas of all trees and by dividing the same with the size of the stand.

The simplified way of the invention to produce volume information is to evaluate the crown coverage percentage, the basal area or some corresponding density character on the basis of the size of the segments and to determine, by means of the stand mean height, the volume of the stand in a similar way to Ilvessalo's relascope tables (Tapion Taskukirja 1978). Alternatively, the crown coverage percentage can be determined in such a way that the number of laser pulses hitting tree crowns in relation to the total pulse number is calculated.

In addition to forest estimation, the method can be used for the determination of the value of the forest, which is an interesting problem in real estate economy. The method presented is very cost effective, but also a very accurate means to determine forest value.

Estimation of Changes in the Canopies

Figure 7:
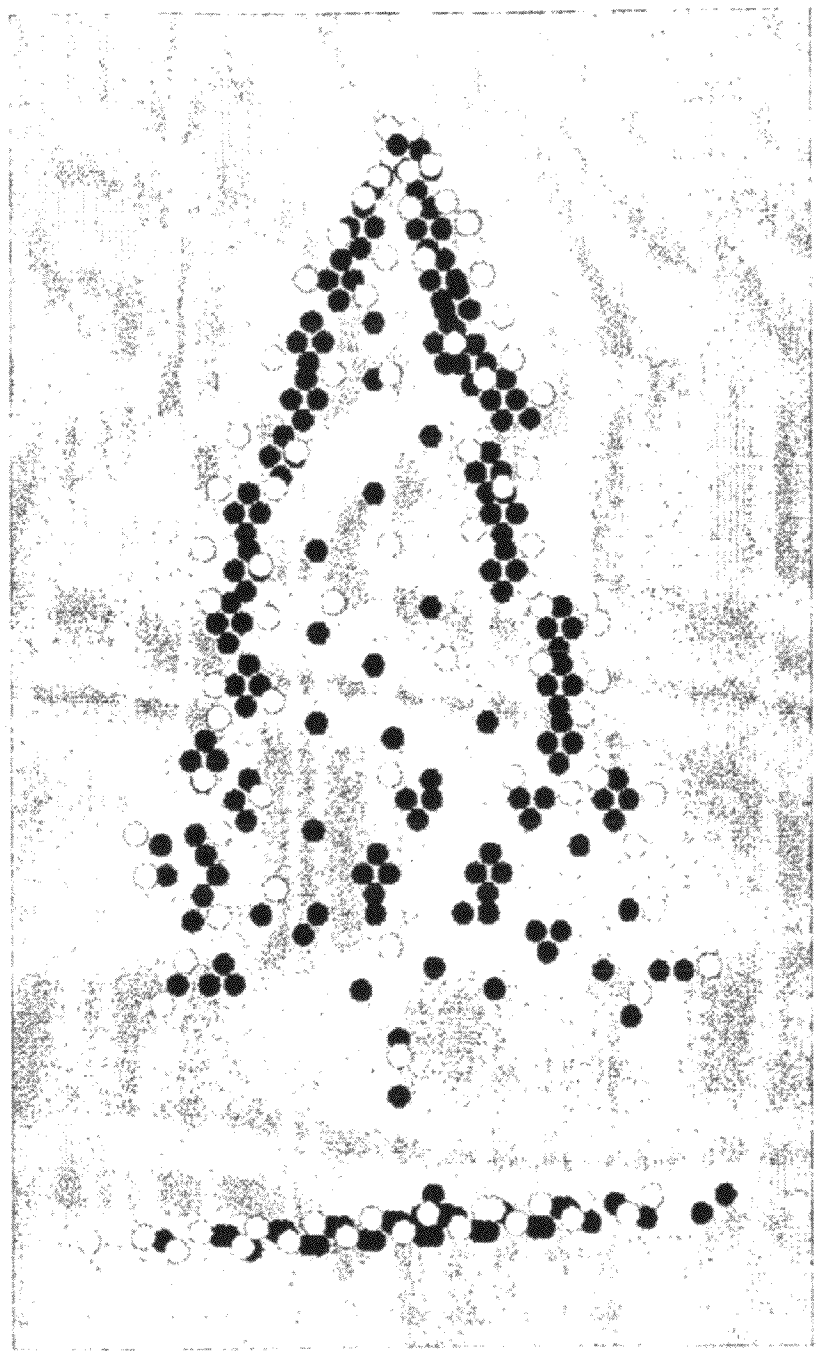
FIG. 7 is an example view of measuring tree growth at different times by means of point clouds. The white points describe the same tree as the black points but measured a couple of years later.

Earlier it has been presented (Finnish patent application 20030479, method, apparatus and program of determination of tree growth) that the growth of the stand can be calculated by means of dense point clouds produced by laser. The new feature is that the growth of the stand can be calculated by means of photogrammetrically densified point clouds in the same way as by using dense laser point clouds. The growth has been possible to determine by means of laser point clouds done at different times for individual trees (unpublished document by Hyyppä 2004). Photogrammetrically densified point clouds are probably a little more inaccurate but still the preliminary results show that the height growth of individual trees can be determined with an accuracy of about 50 cm, an example is shown in FIG. 7. This means that it is already realistic to determine a five years growth for individual trees. As the whole growth can be determined for individual trees with a moderate accuracy, which is even better than the growth achieved with the use of conventional hypsometers, the stand and sample plot wise growths can be determined with a very good accuracy. A growth for a sample plot can be determined by means of 100 sample trees with a accuracy of already ca 5 cm and a stand wise growth is possible even with an accuracy of 1 cm. If it is desired to analyze the growth and remove the effect of harvested and fallen trees, those matching trees that are to be included in the analysis should be possible to identify from measurements performed at different times. A possible systematic error for the growth estimations should, however, be calibrated away from the results by using known methods.

Also a surface model for the crowns can be calculated by means of photogrammetrically densified point clouds. By calculating the difference between crown surface models corresponding to different times, the harvested and fallen trees can be observed from the difference image, FIGS. 8 and 9. Individual harvested or fallen trees can be determined by using known methods of automatic interpretation (biasing, removing noise, segmentation), see FIG. 9.

Also the other kind of growth than the height growth of the crowns of the stand can be determined from the difference of the surface models of the crowns. The horizontal and volume growth of the crowns can be determined from the difference image by using known methods.

Growth information of trees can also be used in the investigation of flight obstacles, whereby it can be estimated, by means of growth information calculated from a densified point cloud, when the trees should be harvested. Also the need of cutting trees around power lines can be predicted.

Correction of Brightness Values in Aerial Images

There are variations in the aerial images due to variation in the incident and measurement angle, which is a result of anisotropy in the object. This is also the reason for why the sun side of the crown is light and the other side dark. By knowing the geometric surface model of the crown, the variation in the brightness values caused by the varying sun angle be corrected by using known methods. After the anisotropy correction of the brightness values, the brightness values of the aerial image are considerably more suitable for e.g. classification of tree species.

Updating of Old Inventory Information

The information of those stands wherein no changes have taken place between two time points can be calibrated by means of old inventory information. Changed stands can be determined by means of densified point clouds or only by laser based interpretation of changes or only by photogrammetric interpretation of changes by using the crown models and the differences in those produced by these materials. Also the growth between the different time points can be determined by means of the crown models. By knowing the growth, the results given by the both remote sensing information, which is achieved at the different time points, and the stand attributes of given stands and sample plots from earlier inventory, new stand attributes can be calculated with known statistical methods, FIG. 11. At the same time, reference data is achieved for the calibration of the results from this method.

The Possibilities of Mobile Mapping

The method can be used, not only with material achieved by aerial photography and airborne laser scanning, but also by using terrestrial overlapping images and terrestrial laser point clouds. These materials can be produced from a car, a stand or hand frames. With terrestrial imaging, an accurate stem diameter can be produced from the tree and an accurate model for the stem curve as well as an accurate model of the crowns as a cross-section.

GENERAL APPLICABILITY

The method is suitable for inventory of individual trees, test areas, stands and larger forest areas. The following is a presentation of the applicability of the method for national forest inventory, which is important inventory besides stand wise forest inventory.

National forest inventory is a very suitable application for the presented method. Generally, a strip of some hundred meters wide is produced from the target with a laser scanner. In this case, either a broader area can be produced or individual trees that already are described quite accurately by means of laser scanning can be densified photogrammetrically. In the national forest inventory, a material achieved by laser scanner enables a decreased amount of field work and individual tree and sample plot information obtained using a laser scanner can be used to teach satellite images. Also the flying process is efficient in the national forest inventory. The lines can be planned to cover the whole country. The national forest inventory can be automated almost completely by means of the method. In the Forest Research Institute, they have tried to develop the collecting of stand information and decreasing of sample plot information by means of imaging spectrometer (Aisa). The results achieved with Aisa are, however, significantly poorer than those achieved with the method of this invention.

While the present invention has been described in accordance with preferred compositions and embodiments, it is to be understood that certain substitutions and alterations may be made thereto without departing from the spirit and scope of the following claims.

The invention claimed is:

1. A method for determination of stand attributes by means of a laser scanner and images, in which a point cloud with three-dimensional information about the target points and describing the stand is produced by means of a laser scanner and overlapping images, comprising:
producing overlapping images by aerial or terrestrial photography,
producing a point cloud by using a laser scanner,
densifying the point cloud with three-dimensional information from the overlapping images to produce a denser point cloud with more target points, and
determining stand attributes by means of the densified point cloud.

2. The method according to claim 1 wherein the point cloud and the overlapping images are combined to belong to the same target.

3. The method according to claim 1 wherein the three-dimensional information of the point cloud produced by means of a laser scanner is formed of three-dimensional coordinates for the target points.

4. The method according to claim 1 wherein points measured from a surface of the terrain and points measured above the surface of the terrain are distinguished from the point cloud produced by laser scanning, and three-dimensional points are added close to those points that are produced by a laser scanner and that correspond to points measured above the surface of the terrain.

5. The method according to claim 1 wherein in order to determine three-dimensional coordinates for the target points the data achieved from the laser measurements and the image information of the aerial or terrestial photography are calculated into the same coordination system.

6. The method according to claim 1 wherein the three-dimensional target coordinates of the additional points are determined from the overlapping images produced by aerial or terrestial photography by means of photogrammetric methods.

7. The method according to claim 1 wherein the step of determining is performed by means of a pattern recognition method, by determination of models describing the crowns of the stand and the terrain, or by means of coordinate information.

8. The method according to claim 1 wherein such a number of target points is applied that individual trees and groups of trees are discriminated.

9. The method according to claim 1 wherein brightness values are produced for the points in addition to the three-dimensional coordinates by means of a camera or spectrometry.

10. The method according to claim 1 wherein the laser scanner material used for the creation of a denser point cloud has several pulses modes or profile data.

11. The method according to claim 1 wherein a three-dimensional presentation of the stand height is achieved by calculating, from the denser point cloud, the difference between a crown model corresponding to the upper parts of the stand and a digital terrain model corresponding to the surface of the terrain.

12. The method according to claim 1 wherein an anisotropy correction for the brightness values of an image is done for individual trees or groups of trees by means of the denser point cloud by using a crown model created by means of the denser point cloud.

13. The method according to claim 1 wherein a change in the stand can be calculated by means of denser point clouds or by means of surface models corresponding to them achieved at two different time points.

14. The method according to claim 1 wherein the identification of individual trees or groups of trees is done by using the denser point cloud, the height model, surface models, intensity data of the laser scanning, profile data and/or brightness values of the images by means of a known pattern recognition method.

15. The method according to claim 1 wherein the identification of individual trees or groups of trees takes place by using images and the height for a desired tree is achieved by means of denser point cloud material.

16. The method according to claim 1 wherein old inventory information, earlier images and/or laser materials is used for evaluation or updating of stand attributes.

17. The method according to claim 1 wherein the tree geometry and/or the delineation of the tree is determined by means of sample points achieved inside the area restricted by the tree either two-dimensionally or three-dimensionally in order to identify the tree species or for modeling of the stand.

18. The method according to claim 1 wherein the attributes of individual trees or groups of trees, which are achieved by analyzing the canopy height model, are the location of the trees, age, height, crown diameter, crown delineation, stem diameter, quality of timber wood, tree value, basal area, crown closure percentage, development class, tree species, stem volume, and/or stem number per area unit and statistical attributes that are be derived by means of this information.

19. The method according to claim 1 wherein the stem diameter of the tree can be derived by means of the mean diameter of the crown or the tree height and the mean diameter of the crown and by making use of rules based on knowledge and possible for each tree species separately.

20. The method according to claim 18 wherein the stem number is determined as a number of crowns determined form a image or point cloud.

21. The method according to claim 1 wherein the crown coverage percentage is defined as the relation between the area covered by the crowns and the whole surface.

22. The method according to claim 1 wherein in addition to attributes of individual trees of groups of trees and statistical data for these, also a stem number and the crown coverage percentage of a stand that is seen from above, are defined for a larger tree group, and this information is used in the estimation of attributes for sample plots and stands.

23. The method according to claim 1 wherein the stand volume is completely or partly defined by means of the mean height of the stand and the crown coverage percentage.

24. The method according to claim 1 wherein the definition of stand attributes is performed by means of a computer program.

25. A non-transitory computer readable medium storing a computer program of a computer for the determination of stand attributes from information achieved by means of a laser scanner and images and in which there is produced a point cloud with three-dimensional information about the target points and describing the stand, comprising: with the computer program of the computer,
a) producing a denser point cloud with more target points and three-dimensional information by densifying the point cloud produced by the laser scanner with information from overlapping images produced by aerial or terrestial photography, and
b) determining stand attributes by means of the denser point cloud.

* * * * *